United States Patent [19]

Sibole

[11] Patent Number: 4,872,790
[45] Date of Patent: Oct. 10, 1989

[54] SEGMENTED DIE

[76] Inventor: Wade Sibole, 15704 Livingston Rd., Accokeek, Md. 20607

[21] Appl. No.: 134,905

[22] Filed: Dec. 18, 1987

[51] Int. Cl.⁴ .............................................. B23G 5/00
[52] U.S. Cl. ...................................... 408/221; 10/111; 10/120
[58] Field of Search ................. 10/1 R, 1 B, 111, 113, 10/120, 121, 123; 408/162, 187, 221; 411/432, 433

[56] References Cited

U.S. PATENT DOCUMENTS

| | | | |
|---|---|---|---|
| 162,983 | 5/1975 | Wells | 408/162 X |
| 1,416,059 | 5/1922 | Piel | 76/101 B |
| 1,589,541 | 6/1926 | Miller | 10/123 R |
| 1,803,888 | 5/1931 | Basola et al. | 408/187 |
| 1,951,581 | 3/1934 | Smith et al. | 408/187 X |
| 3,078,743 | 2/1963 | Wolfe | 408/187 |
| 4,572,032 | 2/1986 | Kinzler | 408/221 X |

FOREIGN PATENT DOCUMENTS 558580  1/1944  United Kingdom .................. 10/121

*Primary Examiner*—E. Micheal Combs

[57] ABSTRACT

A threading or rethreading die made up of a plurality of complementary separable interfitting parts held together by a tension spring disposed around the exterior surface thereof which in use are separated from one another under the tension of the spring thereby enabling the die to be passed over a member to be threaded or rethreaded whereat the separating force is relaxed permitting the parts to re-engage on the member. The die is then turned to effect the cutting of the threads.

3 Claims, 1 Drawing Sheet

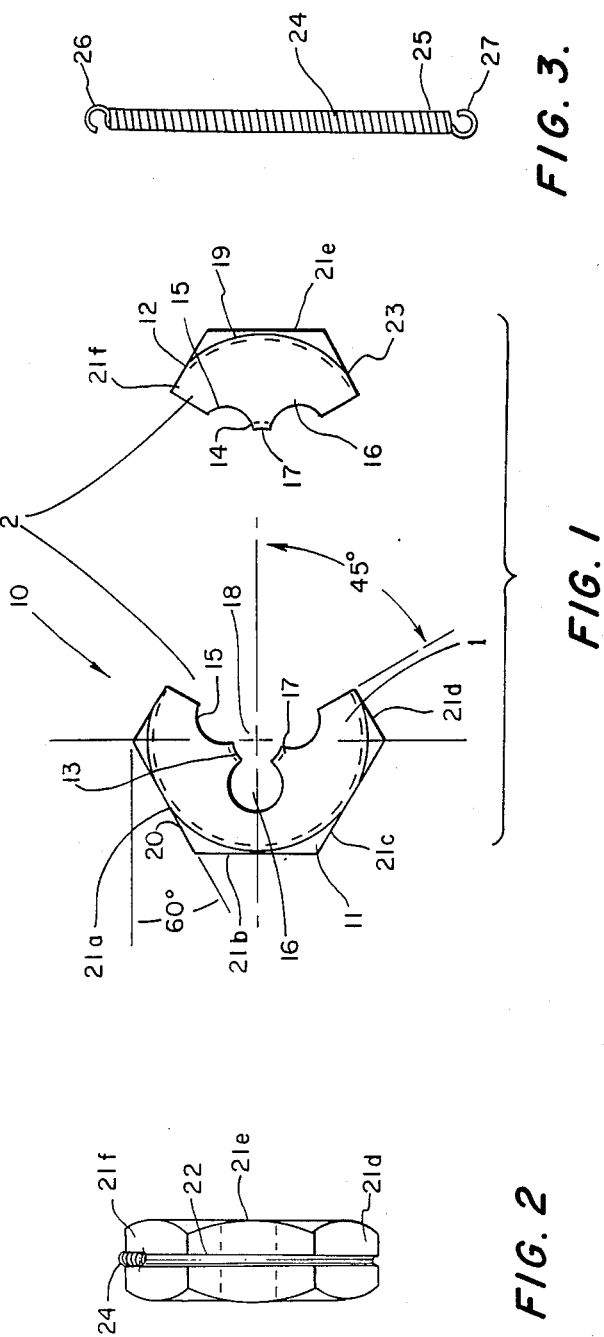

SEGMENTED DIE

BACKGROUND OF THE INVENTION

The present invention relates to dies for repairing damaged threads on threaded stud-like members in situ in order to avoid disassembling the device to replace the damaged part. Generally, the prior art suggests overcoming the problem of disassembling the device by providing a split die which can be separated to permit the same to be opened to pass over and along the elongated element to be repaired and then reassembled adjacent the area to be rethreaded. The die is then turned and advanced to cut the new threads. Dies of this nature are typified by U.S. Pat. Nos. 1,951,581 and 4,572,032.

Additionally, the inventor is aware of prior art, U.S. Pat. Nos. 1,366,884, 1,915,588, 2,377,581, 2,644,023 and 3,038,366 dealing with split nuts which can be separated and re-engaged for placement on a threaded shaft.

SUMMARY OF THE INVENTION

The present invention is directed to split dies and generally is similar to the aforementioned prior art, differing only in the manner in which the same is manufactured and assembled.

To this end, the die is split into at least two separate interfitting parts having at least one cutting lobe with material receiving recesses on either side thereof which when mated together defines a central opening through which an elongated member to be threaded or rethreaded extends. A wrench or other turning tool is placed over the outer surface of the die to turn the same to cut threads in the same.

BRIEF DESCRIPTION OF THE DRAWING

FIG. 1 is a front exploded view showing the parts of the die;

FIG. 2 is a side view of the same; and

FIG. 3 is a view showing the peripheral engaging spring which maintains the die parts in assembled relationship.

DESCRIPTION OF THE PREFERRED EMBODIMENT

Referring to FIG. 1 of the drawing, the thread cutting die of the present invention is depicted generally by the numeral 10 and is seen to be comprised of two separate complementary interfitting parts 11 and 12 having at least one lobe 13,14 formed on the interior thereof with recesses 15,16 disposed on either side thereof. The uppermost section of the lobes 13,14 have threads 17 cut therein, as shown in dotted outline.

The die 10 is conventional in all respects except for the manner in which it is formed. When the parts 11 and 12 are mated to form the member 10, the spaced lobes and recesses define an annular inner space 18 through which a shaft of a bolt, screw or the like can extend. The outer surfaces 19,20 of the parts 11 and 12 define a plurality of contiguous flat, side surfaces 21a-f, which are adapted to be engaged by a wrench or the like for turning the same to form or cut the threads on the member to be threaded. In makeup, and as seen, part 11 comprises about three-quarters of, and part 12, about one-quarter of, the entire die 10.

While two parts such as 11 and 12 are preferred, it is to be understood that the die 10 can be divided into as many parts as desired, and that the size and number of cutting surfaces can be designed as needed.

When reference to the side view of FIG. 2, the die 10 is seen to be provided with a continuous annular recess 22 cut into the sides 21a-f, and shown by the dotted outline 23 in FIG. 1. The recess 22 receives a spring 24 shown in FIG. 3 as an elongated coiled member 25 having securing hooks 26,27 at each end thereof. The spring 24 is wrapped in the recess 22 with the free ends 26,27 connected to one another, with respective portions thereof staked or otherwise secured to the parts 11 and 12.

The spring 24 is tensioned to maintain the parts 11,12 in normal mating engagement while allowing the same to separate from one another in order that the same may be expanded to readily pass over an elongated element to be threaded.

In use, when an element is to be threaded or rethreaded, the die is grasped and the parts 11 and 12 completely separated from one another under the tension of the spring 24 with the opening 18 being moved lengthwise over the element to the area where the threading or rethreading is to be done. At this point, the pulling force is relaxed and the parts under the tension of the spring are re-engaged on the member. A wrench or other turning tool is positioned on the exterior of the die and turned to cut the thread.

I claim:

1. A die comprising at least two completely separable complementary members interfitting each other, each of said members having an inner surface defining at least one lobe with recesses positioned on either side thereof, said lobes having thread cutting surfaces thereon whereby the lobes and recesses define an annular inner surface and a substantially contiguous outer surface when the members are mated together, said outer surface being formed of a plurality of flat contiguous wrench-engaging surfaces, a recess formed and extending about the entire wrench-engaging surfaces, an expansible coiled spring of annular configuration seated in said recess maintaining said members in mating engagement allowing the members to separate out of contact with one another to permit their passing over an element to be threaded and thereafter to be re-engaged therewith, whereafter the wrench-engaging surfaces can be engaged for turning the same.

2. The die of claim 1 wherein the spring means is anchored to each of the members for maintaining the same in an assembled condition.

3. The die of claim 2 wherein the spring means has securing means at each end for securing one end to the other.

* * * * *